(12) United States Patent
Avigdor et al.

(10) Patent No.: US 10,437,167 B2
(45) Date of Patent: Oct. 8, 2019

(54) INK COMPOSITION

(71) Applicant: HP Indigo B.V., Amstelveen (NL)

(72) Inventors: Reut Avigdor, Modiin (IL); Tehila Ben-Ezra, Nes Ziona (IL); Yael Kowal-Blau, Givataim (IL); Yaron Grinwald, Meitar (IL); Albert Teishev, Rishon le-Zion (IL); Eyal Shelef, Tel-Aviv (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/565,107

(22) PCT Filed: Jul. 31, 2015

(86) PCT No.: PCT/EP2015/067726
§ 371 (c)(1),
(2) Date: Oct. 6, 2017

(87) PCT Pub. No.: WO2017/020938
PCT Pub. Date: Feb. 9, 2017

(65) Prior Publication Data
US 2018/0120725 A1    May 3, 2018

(51) Int. Cl.
*G03G 9/13* (2006.01)
*C09D 11/00* (2014.01)
*C09D 11/03* (2014.01)
*C09D 11/36* (2014.01)
*C09D 11/38* (2014.01)
*C09D 11/52* (2014.01)
*G03G 9/135* (2006.01)

(52) U.S. Cl.
CPC ............ *G03G 9/131* (2013.01); *C09D 11/00* (2013.01); *C09D 11/03* (2013.01); *C09D 11/36* (2013.01); *C09D 11/38* (2013.01); *C09D 11/52* (2013.01); *G03G 9/132* (2013.01); *G03G 9/135* (2013.01); *G03G 9/1355* (2013.01)

(58) Field of Classification Search
CPC .......... G03G 9/12; G03G 9/135; G03G 9/131; G03G 9/132
See application file for complete search history.

(56) References Cited

U.S. PATENT DOCUMENTS

| 3,776,849 A | 12/1973 | Tellier |
| 3,878,120 A * | 4/1975 | Nagashima ............ G03G 9/125 430/113 |
| 3,939,085 A | 2/1976 | Smith et al. |
| 3,997,456 A * | 12/1976 | Voss ..................... G03G 9/12 430/115 |
| 3,998,746 A * | 12/1976 | Tsuneda .................. G03G 9/13 430/114 |
| 4,197,211 A * | 4/1980 | Amidon ................ G03G 9/131 430/115 |
| 4,259,428 A * | 3/1981 | Tsuneda ................. G03G 9/131 430/115 |
| 4,719,165 A | 1/1988 | Kitatani et al. |
| 5,658,701 A | 8/1997 | Kato |
| 5,695,855 A | 12/1997 | Yeo et al. |
| 8,247,151 B2 | 8/2012 | Victor et al. |
| 8,843,049 B2 | 9/2014 | Kabata et al. |
| 9,429,863 B2 * | 8/2016 | Ikedo ..................... G03G 9/122 |
| 2004/0225030 A1* | 11/2004 | Yon ...................... C09D 11/037 523/160 |
| 2011/0008725 A9* | 1/2011 | Marko ................... C09D 11/30 430/114 |
| 2014/0363208 A1* | 12/2014 | Roditi .................. G03G 9/0804 399/237 |
| 2015/0370190 A1* | 12/2015 | Ikedo ..................... G03G 9/122 430/114 |
| 2018/0031996 A1* | 2/2018 | Fisher .................. G03G 9/1355 |

FOREIGN PATENT DOCUMENTS

| EP | 0410800 | 1/1991 | |
| JP | H10207131 | 8/1998 | |
| WO | 2014/123121 | * 8/2014 | .............. G03G 9/13 |

OTHER PUBLICATIONS

Diamond, Arthur S. (editor) Handbook of Imaging Materials. New York: Macel-Dekker, Inc. (2002) pp. 239-247, 254-257.*
International Search Report and Written Opinion for International Application No. PCT/EP2015/067726 dated Dec. 23, 2015, 10 pages.

* cited by examiner

*Primary Examiner* — Christopher D Rodee
(74) *Attorney, Agent, or Firm* — Dierker & Kavanaugh PC

(57) ABSTRACT

Provided in one example herein is a liquid electrophotographic ink composition. The composition includes a charge director, a non-polar carrier fluid comprising a polymer; and ink particles each including a polymeric resin and a pigment dispersed in the resin. The ink composition also includes a tackifier.

10 Claims, 5 Drawing Sheets

INK COMPOSITION

BACKGROUND

One example of digital printing is electrophotographic printing. Liquid electrophotographic printing, or "LEP," is a specific type of electrophotographic printing, in which a liquid ink (or "LEP ink"), instead of a powder toner, is employed in the electrophotographic process.

BRIEF DESCRIPTION OF THE DRAWINGS

The patent or application file contains at least one drawing executed in color. Copies of this patent or patent application publication with color drawings will be provided by the Office upon request and payment of the necessary fee.

The drawings are provided to illustrate various examples of the subject matter described herein in this disclosure (hereafter "herein" for short, unless explicitly stated otherwise) related to a composition for LEP, particularly one that comprises a tackifier, and are not intended to limit the scope of the subject matter. The drawings are not necessarily to scale.

FIG. 6A ink composition without a tackifier; and FIG. 6B: ink composition with a tackifier.

DETAILED DESCRIPTION

Figure 1:
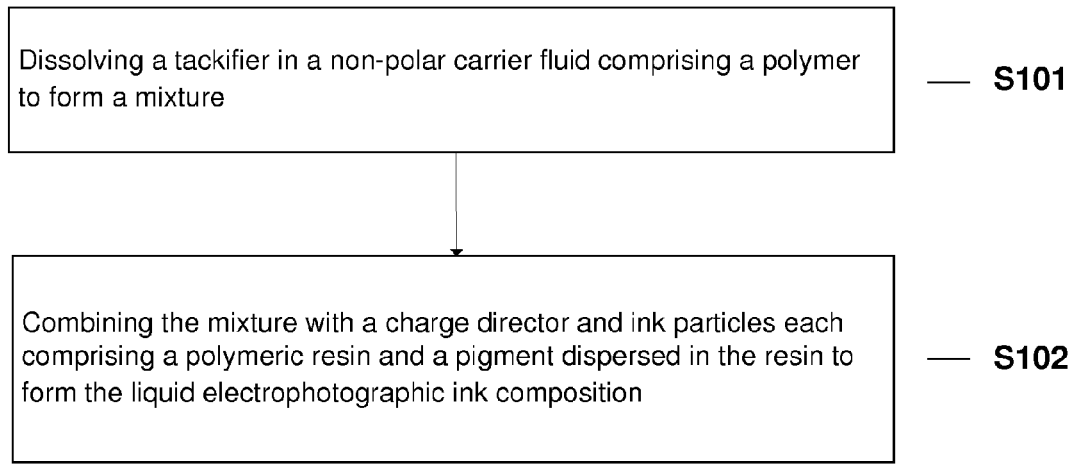
FIG. 1 is a schematic flowchart showing the processes involved in one example method of manufacturing the ink composition described herein.
Figure 2:
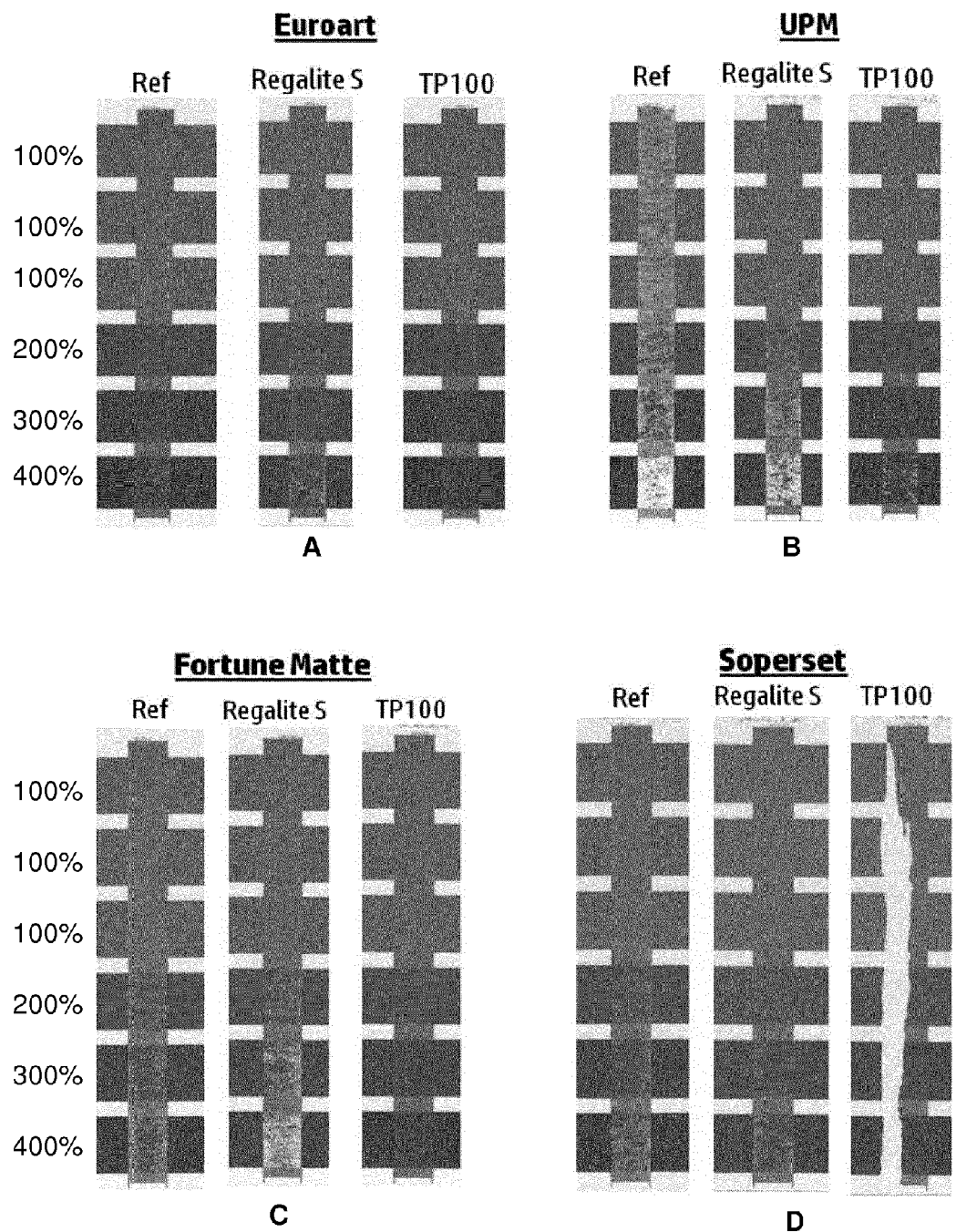
FIGS. 2A-2D show, in one example, the peeling tests for ink compositions on the four different substrates (A: Euroart; B: UPM; C: Fortune Matte; and D: Soperset).
Figure 3:
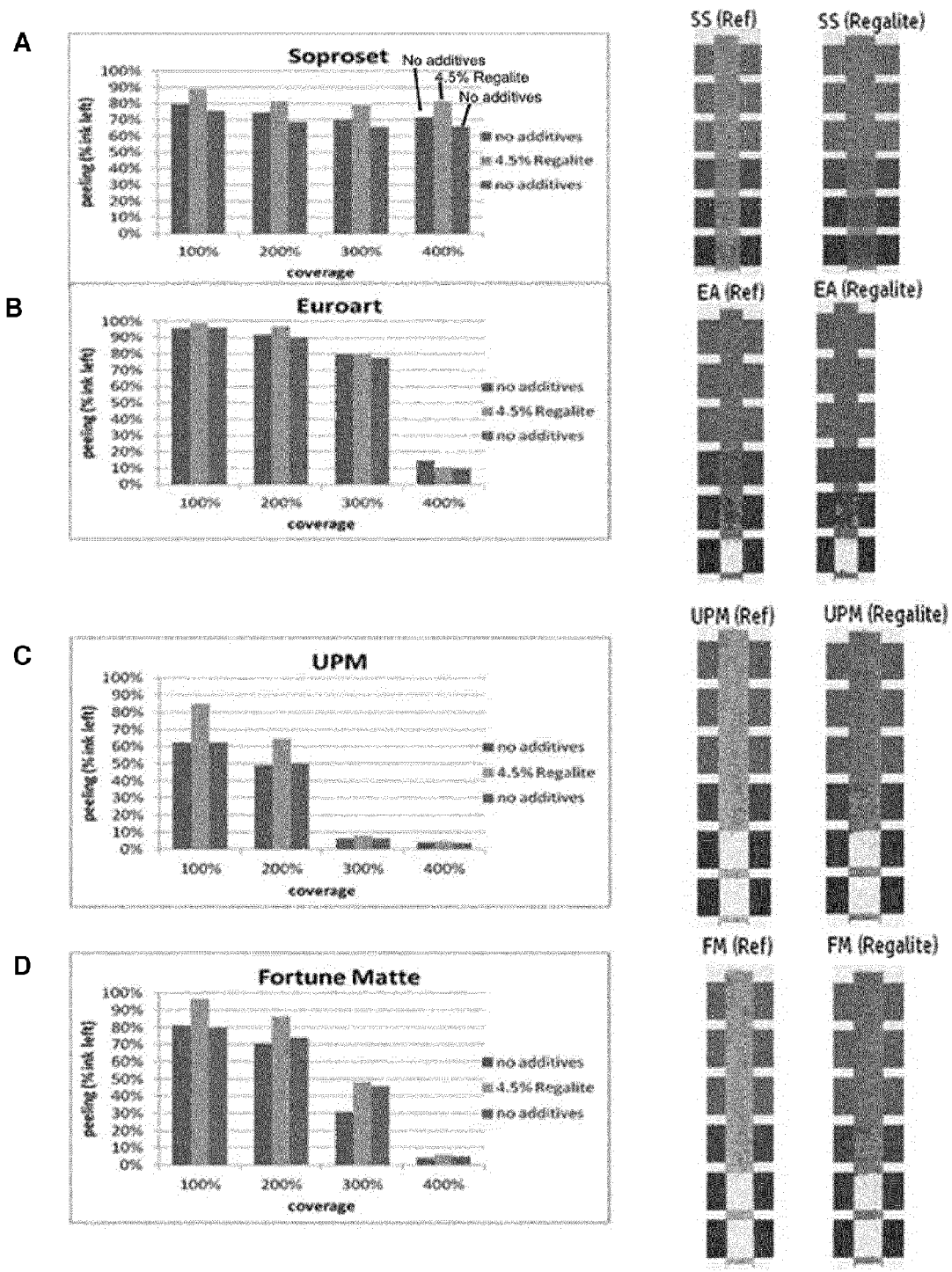
FIGS. 3A-3D show, in one example, the peeling tests for ink compositions on the four different substrates (A: Soperset; B: Euroart; C: UPM; and D Fortune Matte).

Electrophotographic printing processes, sometimes known as electrostatic printing processes, may involve creating an image on a photoconductive surface, applying a printing composition having charged particles to the photoconductive surface, such that they selectively bind to the image, and then transferring the charged particles in the form of the image to a print substrate.

The photoconductive surface may be on a cylinder and is also known as a photo imaging plate ("PIP"). The photoconductive surface may be selectively charged with a latent electrostatic image having the image and the background areas with different potentials. For example, a printing composition comprising charged toner particles in a carrier fluid may be brought into contact with the selectively charged photoconductive surface. The charged toner particles adhere to the image areas of the latent image while the background areas remain clean. The image is then transferred to a print substrate (e.g., paper) directly, or by being first transferred to an intermediate transfer member, which may be a soft swelling blanket often heated to fuse the solid image and evaporate the carrier fluid, and then to the print substrate.

To obtain the desirable level of durability of the ink composition, often mechanically strong and high molecular weight resins are employed. However, this type of resin may often encounter the challenge of adhesion and transferability. Specifically, this type of resin may have a low affinity to the substrate, thus reducing the adhesion of the ink composition to the substrate and transferability thereof.

In view of the aforementioned challenges, the Inventors have recognized and appreciated the advantages of an ink composition described herein. Following below are more detailed descriptions of various examples related to a liquid electrophotographic ink composition, particularly one comprising a tackifier. The various examples described herein may be implemented in any of numerous ways.

Provided in one aspect of the examples is a liquid electrophotographic ink composition, comprising: a charge director; a non-polar carrier fluid comprising a polymer; and ink particles each comprising a polymeric resin and a pigment dispersed in the resin; and a tackifier.

Provided in another aspect of the examples is a method of manufacturing a liquid electrophotographic ink composition, the method comprising: dissolving a tackifier in a non-polar carrier fluid comprising a polymer to form a mixture; combining the mixture with a charge director and ink particles each comprising a polymeric resin and a pigment dispersed in the resin to form the liquid electrophotographic ink composition.

Provided in another aspect of the examples is an article, comprising: a substrate; an electrophotographic ink composition printed over at least a portion of the substrate, the electrophotographic ink composition comprising: a charge director; a non-polar polymer comprising an isoparaffin; ink particles each comprising a polymeric resin and a pigment dispersed in the resin; and a tackifier.

Liquid Electro Photographic Printing

The term "electrostatic ink composition" or "liquid electrophotographic composition" herein may refer to an ink composition that is suitable for use in an electrostatic printing process, also known as an "electrophotographic printing process." It may comprise ink particles, which may comprise a thermoplastic resin.

The term "copolymer" refers to a polymer that is polymerized from at least two monomers.

The term "melt flow rate" may refer to the extrusion rate of a resin through an orifice of defined dimensions at a specified temperature and load, usually reported as temperature/load, e.g., 190° C./2.16 kg. Flow rates may be used to differentiate grades or provide a measure of degradation of a material as a result of molding. "Melt flow rate" herein may refer to that measured per ASTM D1238-04c Standard Test Method for Melt Flow Rates of Thermoplastics by Extrusion Plastometer. If a melt flow rate of a particular polymer or copolymer is specified herein, unless otherwise stated, it refers to the melt flow rate for that polymer or copolymer alone, in the absence of any of the other components of the LEP printing composition.

The term "acidity," "acid number," or "acid value" may refer to the mass of potassium hydroxide (KOH) in milligrams that neutralizes one gram of a substance. The acidity of a polymer or copolymer may be measured according to standard techniques, for example as described in ASTM D1386. If the acidity of a particular polymer or copolymer is specified, unless otherwise stated, it is the acidity for that polymer or copolymer alone, in the absence of any of the other components of the LEP printing composition.

The term "melt viscosity" may refer to the ratio of shear stress to shear rate at a given shear stress or shear rate.

Testing may be performed using a capillary rheometer. A plastic charge is heated in the rheometer barrel and is forced through a die with a plunger. The plunger is pushed either by a constant force or at constant rate depending on the equipment. Measurements may be taken once the system has reached steady-state operation. One method used is measuring Brookfield viscosity at 140° C., units are mPa-s or cPoise ("CP"). In another method, the melt viscosity is measured using a rheometer, e.g., a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer or copolymer is specified, unless otherwise stated, it is the melt viscosity for that polymer or copolymer alone, in the absence of any of the other components of the LEP printing composition.

When a standard test is mentioned herein, unless otherwise stated, the version of the test to be referred to is the most recent at the time of filing this patent application.

The term "electrostatic printing" or "electrophotographic printing" may refer to the process that provides an image that is transferred from a photo imaging substrate either directly or indirectly via an intermediate transfer member to a print substrate. As such, the image is at least substantially not absorbed into the photo imaging substrate on which it is applied. Additionally, "electrophotographic printers" or "electrostatic printers" generally may refer to those printers capable of performing electrophotographic printing or electrostatic printing as described herein. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g., an electric field having a field gradient of 50-400 V/μm or more—e.g., 600-900 V/μm or more.

The term "colored" is used to refer to any color, including white and black.

The term "colored toner image" refers to an image formed from an LEP ink. An LEP ink may contain a pigment.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Liquid Electrophotographic Printing Ink Composition

An LEP ink may be any known LEP ink composition comprising a first polymeric resin and a second polymeric resin, such as any of those described herein. The composition may further comprise a carrier fluid. The composition may further comprise a colorant. The composition may further comprise a charge director and/or a charge adjuvant. In one example an LEP ink composition may lack a second polymeric resin as described herein. In one example, the LEP ink composition may be HP Indigo's Electroink® 4.5.

To the extent applicable, the terms "first," "second," "third," etc. herein are merely employed to show the respective objects described by these terms as separate entities and are not meant to connote a sense of chronological order, unless stated explicitly otherwise herein.

A "melting point" may be measured, and thus defined, herein using differential scanning calorimetry ("DSC") and may be determined from the first heat flow minima reached on heating the polymeric resin from −50° C. at a rate of 15° C./min. The "melting point" of a polymeric resin may be measured using established standard procedures, for example using the procedure described ASTM D3418.

The terms "partially molten," "partially melt," and "partially melted" are used to refer to an image containing a polymeric resin in which the polymeric resin has been at least partially melted or softened. This may be determined as when the resin has become tacky. A polymeric resin may become partially molten when heated to a temperature approaching the melting point of the polymeric resin. For example, an (ink) image may be considered to be at least partially molten when the image has reached a temperature that is about 20° C. or less below the melting point of the polymeric resin. In one example, the image is considered to be at least partially molten when the image has reached a temperature that is about 15° C. or less below the melting point of either the first polymeric resin or the second polymeric resin. In one example, the image is considered to be at least partially molten when the image has reached a temperature that is about 10° C. or less below the melting point of either the first polymeric resin or the second polymeric resin. In one example, the image is considered to be at least partially molten when the image has reached a temperature that is about 5° C. or less below the melting point of either the first polymeric resin or the second polymeric resin. In one example, the second polymeric resin has a lower melting temperature than the first polymeric resin, and thus the frame of reference of "partially molten" is the melting point of the second polymeric resin.

In one example, an image is considered to be at least partially molten when the image has been held at a temperature approaching the melting point of either the first or second polymeric resin for at least 0.5 seconds, in one example at least 1 second, in one example at least 5 seconds, in one example at least 10 seconds The temperature range at which a first or second polymeric resin will start to soften or partially melt from data obtained may be determined by using differential scanning calorimetry ("DSC") on a resin sample using the procedure described in ASTM D3418 showing heat flow to the sample over a temperature range covering the melting point of the resin component. A graph showing the heat flow to the sample against temperature obtained by DSC may show a broad trough for the melting point of the resin. At temperatures below the melting point of the resin, determined as described above, but still within the broad trough the resin will be softened or partially molten.

The ink composition described herein may have any color. In one example, the ink composition, particularly the one having a first and a second polymeric resins, is transparent.

Ink Particles

The ink composition described herein may comprise any number of suitable constituents. For example, the ink composition may comprise ink particles (in some instances known as toner particles) and a carrier fluid in which the ink particles are dispersed. An ink particle may be a composite comprising at least one polymeric resin (in some instances known as a binder), such as a polymeric resin mixture, and a colorant. The colorant may be a dye, pigment particles, etc.

The term "pigment" may refer to pigment colorants, magnetic particles, alumina, silica, and/or other ceramics or organometallics, whether or not such particulates impart color. In some instances, the term "pigment" may be used more generally to describe not just pigment colorants, but other pigments such as organometallics, ferrites, ceramics, etc.

The ink particles are the solid constituents, as opposed to a liquid constituent (e.g., carrier fluid) of an ink composition. The ink composition may also comprise a charge director and/or charge adjuvant dispersed in the carrier fluid. The polymeric resin of the ink particles may facilitate the attachment of the charge director(s) to the ink particles, thereby charging the ink particles.

In one example wherein the ink particles comprise a colorant, the colorant may be dispersed in a polymeric resin (binder), which may comprise one polymeric resin or a mixture of multiple polymeric resins. The colorant particles may be distributed in the polymeric resin homogeneously or inhomogeneously. The polymeric resin may encapsulate the colorant particles during the production of an LEP ink. The polymer resin may provide structural integrity for an ink film after printing. Depending on the application, the polymeric resin described herein may refer to any suitable polymeric resin, such as those described below.

The ink particles may have any suitable geometry. For example, the particles may be spherical, ellipsoidal, cubical, cylindrical, spiny, wire-like, sheet-like, flake-like, etc. The ink particles may have an irregular geometry. In one example, the ink particles described herein are spherical. The term "spherical" herein may encompass a shape that is a perfect sphere or almost spherical. The term "almost spherical" may refer to a shape that resembles a sphere but is not completely spherical, such as having a relatively small amount of irregularity deviating from a perfect spherical shape. Thus, a spherical particle herein may refer to a particle having a sphericity of at least about 0.80—e.g., at least about 0.85, about 0.90, about 0.95, or higher. The pigment particles within the ink particles may also have any suitable geometry, such as any of the geometries described herein for the ink particles. The pigment particles may have the same geometry as the ink particles, or they may have a different geometry from the ink particles.

The ink particles may have any suitable size. Depending on the geometry, the term "size" herein may refer to length, width, height, diameter, etc. Also, when referring to a plurality of objects, the value of any of the dimensions described herein may refer to a statistical average. In one example, the ink particles have an average diameter of between about 5 µm and about 80 µm—e.g., between about 10 µm and about 50 µm, between about 15 µm and about 40 µm, between about 20 µm and about 30 µm, etc.

The ink particles may be present in the ink composition at any suitable amount. For example, the ink particles may be present in the ink composition at between about 1 wt % and about 50 wt %—e.g., between about 2 wt % and about 40 wt %, between about 3 wt % and about 30 wt %, between about 4 wt % and about 20 wt %, between about 5 wt % and about 10 wt %, etc. Other content values are also possible. In one example, the ink particles are present in the ink composition at between about 1 wt % and about 10 wt %—e.g., about 2 wt % and about 8 wt %, about 4 wt % and about 6 wt %, etc.

Colorant

The LEP ink composition described herein may or may not comprise a colorant. In one example, the ink composition lacks a colorant. In one example, ink composition lacks an inorganic particulate material. In an example, the ink composition is substantially transparent when printed.

The ink composition may be a substantially colorless, clear, or transparent compositions substantially free from pigment. The term "substantially free from pigment" herein may refer to an ink composition in which less than or equal to 1 wt % of the solids in the ink composition comprises a colorant—e.g., less than or equal to about 0.5 wt %, about 0.1 wt %, about 0.05 wt %, about 0.01 wt %, or less, of the solids in the ink composition. In examples in which the ink compositions are substantially free from pigment, they may be used as glosses and gloss inhibitors in the methods described herein without contributing a further subtractive effect on the CMYK inks that would otherwise substantially affect the color of an under-printed colored image.

The ink composition, either before or after having been printed on a print substrate, may comprise a colorant. The first and/or second polymeric resins may further comprise a colorant.

The colorant may be selected from a pigment, dye, or both. The colorant may be transparent, unicolor, or being any combination of available colors. The colorant may be selected from a white colorant, a cyan colorant, a yellow colorant, a magenta colorant and a black colorant. The ink composition may comprise a plurality of colorants. The ink composition may comprise a first colorant and second colorant, which are different from one another. Further colorants may also be present with the first and second colorants. The ink composition may comprise first and second colorants where each are independently selected from a white colorant, a cyan colorant, a yellow colorant, a magenta colorant and a black colorant. In one example, the first colorant comprises a black colorant, and the second colorant comprises a non-black colorant, for example a colorant selected from a white colorant, a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

The colorant may comprise a pigment. The pigments may be any pigment compatible with the liquid carrier and useful for electrostatic printing. For example, the pigment may be present as pigment particles, or may comprise a resin (in addition to the polymers described herein) and a pigment. The resins and pigments may be any of those commonly used in the industry. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The pigment particles in the ink particles may have any suitable size. The size of the pigment particles generally is smaller than that of the ink particles. In one example wherein the ink particles comprise very little, such as no, polymeric resin, the size of the pigment particles is about the same as that of the ink particles. In one example, while the overall ink particles have the aforementioned average diameters, the pigment particles have an average diameter of between about 50 nm and about 600 nm—e.g., between about 100 nm and about 300 nm, between about 200 nm and about 250 nm, etc. Other diameter values are also possible.

The pigment particles may comprise any suitable material. The type of material employed may depend on, for example, the color intended for the pigment particles to provide. For example, the material may comprise at least one ceramic. The ceramic may be a metal oxide. The metal in the metal oxide may be, for example, a transition metal. The metal oxide may comprise at least one of titanium dioxide, aluminum oxide, and zinc oxide. In one example, the metal oxide comprises titanium dioxide. In one example, the metal oxide is titanium dioxide and the ink composition is white. In another example, the metal oxide comprises titanium dioxide and the ink composition is not white. Where the pigment is a white pigment particle, the pigment particle may be selected from the group consisting of $TiO_2$, calcium carbonate, zinc oxide, and mixtures thereof. In one example, the white pigment particle may comprise an alumina-$TiO_2$ pigment. Depending on the application, other types of materials, including other types of metal oxides, may be employed.

The ink particles provided herein may have any suitable level of pigment loading, depending on the application. The term "pigment loading" may refer to the average content of the pigment particles in the ink particles. The content may refer to volume percentage ("vol %") or weight percentage ("wt %"), depending on the context. In one example, the pigment loading refers to the average wt % of the pigment particles in the ink particles. In one example wherein the pigment particles comprise at least one metal oxide, the "pigment loading" with respect to each of the at least one metal oxide refers to the average wt % of each of the at least one metal oxide in the ink particles. In one example wherein the pigment particles comprise only one type of metal oxide, the pigment loading of the ink particles as a whole refers to the average wt % of this metal oxide in the ink particles. In one example, pigment loading refers to the average wt % of titanium dioxide in the ink particles. In one example, the pigment loading of a metal oxide in the ink particles is less than or equal to about 60 wt % of the ink particles, such as less than or equal to about 55 wt %—e.g., less than or equal to about 50 wt %, about 40 wt %, about 30 wt %, about 20 wt %, or lower. In one example, the pigment loading of a metal oxide in the ink particles is between about 8 wt % and about 55 wt %—e.g., between about 9 wt % and about 50 wt %, between about 10 wt % and about 40 wt %, between about 11 wt % and about 30 wt %, between about 12 wt % and about 20 wt %, etc. In one example, the pigment loading of a metal oxide in the ink particles is between about 12 wt % and about 18 wt %. In one example, the aforementioned pigment loading refers to that of a white ink composition. Other pigment loading values are also possible. For example, other pigment loading values may be employed for a different color of an ink composition.

Polymeric Resins

The polymeric resin may act as a matrix in which the pigment particles are dispersed/distributed. The polymeric resin may be any suitable polymeric resin material or a mixture of different polymeric resin materials. The polymeric resin may refer to a synthetic polymeric resin or a natural polymeric resin. The ink composition described herein may comprise a polymeric mixture of at least two polymeric resins. In one example, the polymeric resin has two polymeric resins. In another example, the polymeric resin has only one polymeric resin.

The polymer resin may comprise a thermoplastic polymer. The polymer resin may comprise a copolymer. The polymeric resin may comprise copolymers of any suitable microstructure. The polymer resin may comprise a random copolymer. For example, the polymeric resin may comprise an ethylene-based polymeric resin. For example, the polymeric resin may comprise, or be, a random copolymer comprising an ethylene. Examples of suitable ethylene-based polymeric resins comprise copolymers of ethylene, methacrylic acid, and acrylic acid; copolymers of ethylene and an acrylate; copolymers of ethylene and vinyl acetate; or various combinations of these copolymers. When copolymers of ethylene and an acrylate are employed, the acrylate may be a butyl-acrylate, an ethyl-acrylate, a methyl-acrylate, or various combinations thereof. Some commercially available examples of copolymers of ethylene and an acrylate include ELVALOY® AC resins by DuPont Company, USA. Some commercially available examples of copolymers of ethylene and vinyl acetate include ELVAX® resins and BYNEL® resins from DuPont Company, USA.

The polymeric resin may comprise an ethylene acrylic acid resin, an ethylene methacrylic acid resin, or a combination thereof. The ethylene acrylic acid resins and the ethylene methacrylic acid resins may also be described as ethylene acrylic acid copolymers and ethylene methacrylic acid copolymers. In one example, the ethylene acrylic acid resin and the ethylene methacrylic acid resin contain 80 wt % to 99.9 wt % of ethylene and 0.1 wt % to 20 wt % of acrylic or methacrylic acid.

In one example, the polymeric resin has a melting point within the range of from about 80° C. to about 120° C., in one example from about 90° C. to about 110° C. In one example, the first polymeric resin has a melting point within the range of from about 80° C. to about 100° C. The melting point of a resin component may be measured using established procedures, for example using the procedure described ASTM D3418.

Ethylene acrylic acid copolymers and ethylene methacrylic acid copolymers contain acidic side groups. The polymeric resin may contain copolymers having an acidity of 50 mg KOH/g or more, in one example an acidity of 60 mg KOH/g or more, in one example an acidity of 70 mg KOH/g or more, in one example an acidity of 80 mg KOH/g or more, in one example an acidity of 90 mg KOH/g or more, in one example an acidity of 100 mg KOH/g or more, in one example an acidity of 105 mg KOH/g or more, in one example 110 mg KOH/g or more, in one example 115 mg KOH/g or more. The polymeric resin containing a resin having acidic side groups may have an acidity of 200 mg KOH/g or less, in one example 190 mg or less, in one example 180 mg or less, in one example 130 mg KOH/g or less, in one example 120 mg KOH/g or less. Acidity of a resin, as measured in mg KOH/g may be measured using established procedures, for example using the procedure described in ASTM D1386.

The polymeric resin comprising an ethylene acrylic acid copolymer and/or an ethylene methacrylic acid copolymer having acidic side groups may have a melt flow rate of less than about 120 g/10 minutes, in one example about 110 g/10 minutes or less, in one example about 100 g/10 minutes or less, in one example about 90 g/10 minutes or less, in one example about 80 g/10 minutes or less, in one example about 70 g/10 minutes or less, in one example about 60 g/10 minutes or less, in one example about 50 g/10 minutes or less, in one example about 40 g/10 minutes or less, in one example 30 g/10 minutes or less, in one example 20 g/10 minutes or less, in one example 10 g/10 minutes or less.

The polymeric resin containing an ethylene acrylic acid copolymer and/or an ethylene methacrylic acid copolymer having acidic side groups, may have a melt flow rate of about 10 g/10 minutes to about 120 g/10 minutes, in one example about 10 g/10 minutes to about 70 g/10 minutes, in one example about 10 g/10 minutes to 40 g/10 minutes, in one example 20 g/10 minutes to 30 g/10 minutes. The ethylene acrylic acid copolymer and/or the ethylene methacrylic acid copolymer having acidic side groups may have a melt flow rate of. In one example, about 50 g/10 minutes to about 120 g/10 minutes, in one example 60 g/10 minutes to about 100 g/10 minutes. The melt flow rate may be measured using established standard procedures, for example as described in ASTM D1238.

The acidic side groups may be in free acid form or may be in the form of an anion and associated with at least one counterion, such as metal counterions, e.g., a metal selected from the alkali metals, such as lithium, sodium, and potassium; alkali earth metals, such as magnesium or calcium; and transition metals, such as zinc. The polymeric resin selected from ethylene acrylic acid resins, ethylene methacrylic acid resins, or combinations thereof may have acidic sides groups which are at least partially neutralized with metal ions (e.g., Zn, Na, and Li) such as SURLYN® ionomers. The ethylene acrylic acid copolymers and ethylene methacrylic acid copolymers may be such that either the acrylic or methacrylic acid constitute from 5 wt % to about 25 wt % of the ethylene acrylic acid or ethylene methacrylic acid copolymer, in one example from 10 wt % to about 20 wt % of the ethylene acrylic acid or ethylene methacrylic acid copolymer.

The polymeric resin may comprise two different ethylene acrylic acid and/or ethylene methacrylic acid copolymers having acidic side groups. The two copolymers having acidic side groups may have different acidities, which may fall within the ranges mentioned above. The resin may comprise a first copolymer having acidic side groups that has an acidity of from 10 mg KOH/g to 110 mg KOH/g, in one example 20 mg KOH/g to 110 mg KOH/g, in one example 30 mg KOH/g to 110 mg KOH/g, in one example 50 mg KOH/g to 110 mg KOH/g, and a second copolymer having acidic side groups that has an acidity of 110 mg KOH/g to 130 mg KOH/g. In one example, the first copolymer may be NUCREL® 699 (available from DuPont, USA). In one example, the second copolymer may be A-C® 5120 (available from Honeywell, USA).

The ratio of the first copolymer having acidic side groups to the second copolymer having acidic side groups may be from about 10:1 to about 2:1. The ratio may be from about 6:1 to about 3:1, in one example about 4:1.

The polymeric resin may comprise an ethylene acrylic acid and/or an ethylene methacrylic acid copolymer having a melt viscosity of about 15000 poise or less, in one example a melt viscosity of about 10000 poise or less, in one example about 1000 poise or less, in one example about 100 poise or less, in one example about 50 poise or less, in one example about 10 poise or less; said copolymer may be an ethylene acrylic acid and/or an ethylene methacrylic acid copolymer having acidic side groups as described herein. The polymeric resin may comprise a first copolymer having a melt viscosity of about 15000 poise or more, in one example about 20000 poise or more, in one example about 50000 poise or more, in one example about 70000 poise or more; and in one example, the resin may comprise a second copolymer having a melt viscosity less than the first polymer, in one example a melt viscosity of about 15000 poise or less, in one example a melt viscosity of about 10000 poise or less, in one example about 1000 poise or less, in one example about 100 poise or less, in one example about 50 poise or less, in one example about 10 poise or less. The resin may comprise a first copolymer having a melt viscosity of more than about 60000 poise, in one example from about 60000 poise to about 100000 poise, in one example from about 65000 poise to about 85000 poise; a second copolymer having a melt viscosity of from about 15000 poise to about 40000 poise, in one example about 20000 poise to about 30000 poise, and a third copolymer having a melt viscosity of about 15000 poise or less, in one example a melt viscosity of about 10000 poise or less, in one example about 1000 poise or less, in one example about 100 poise or less, in one example about 50 poise or less, in one example about 10 poise or less; an example of the first copolymer is NUCREL® 960 ((available from DuPont Company, USA), and example of the second copolymer is NUCREL® 699 (from DuPont Company, USA), and an example of the third copolymer is A-C® 5120 or A-C® 5180 (available from Honeywell, USA). The first, second, and third copolymers may be selected from ethylene acrylic acid and/or ethylene methacrylic acid copolymers having acidic side groups as described herein. The melt viscosity may be measured using a rheometer, e.g., a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

When the polymeric resin in the ink composition comprises a single type of ethylene acrylic acid or ethylene methacrylic acid copolymer, the copolymer (excluding any other components of the ink composition) may have a melt viscosity of 6000 poise or more, in one example a melt viscosity of about 8000 poise or more, in one example a melt viscosity of about 10000 poise or more, in one example a melt viscosity of about 12000 poise or more. If the polymeric resin comprises a plurality of ethylene acrylic acid and/or ethylene methacrylic acid copolymers, all the copolymers of the first polymeric resin may together form a mixture (excluding any other components of the ink composition) that has a melt viscosity of about 6000 poise or more, in one example a melt viscosity of about 8000 poise or more, in one example a melt viscosity of about 10000 poise or more, in one example a melt viscosity of about 12000 poise or more. Melt viscosity may be measured using standard techniques. The melt viscosity may be measured using a rheometer, e.g., a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The polymeric resin may comprise two different copolymers having acidic side groups that are selected from copolymers of ethylene and an ethylenically unsaturated acid of either acrylic acid or methacrylic acid; or an ionomer of ethylene methacrylic acid copolymer or an ionomer of ethylene acrylic acid copolymer which are at least partially neutralized with metal ions (e.g., Zn, Na, Li) such as SURLYN® ionomers. In one example, the polymeric resin comprises a copolymer of ethylene and methacrylic acid. The polymeric resin may comprise (i) a first copolymer that is a copolymer of ethylene and an ethylenically unsaturated acid of either acrylic acid and methacrylic acid, wherein the ethylenically unsaturated acid of either acrylic or methacrylic acid constitutes from about 8 wt % to about 16 wt % of the copolymer, in one example about 10 wt % to about v16 wt % of the copolymer; and (ii) a second copolymer that is a copolymer of ethylene and an ethylenically unsaturated acid of either acrylic acid and methacrylic acid, wherein the ethylenically unsaturated acid of either acrylic or methacrylic acid constitutes from about 12 wt % to about 30 wt % of the copolymer, in one example from about 14 wt % to about 20 wt % of the copolymer, in one example from about 16 wt % to about 20 wt % of the copolymer in one example from about 17 wt % to about 19 wt % of the copolymer.

The polymeric resin may comprise an ethylene acrylic acid resin and an ethylene methacrylic acid resin. In one example, the ratio by weight of the ethylene acrylic acid resin to the ethylene methacrylic acid resin in the first polymeric resin is from about 5:95 to about 30:70.

The polymeric resin may comprise an ethylene acrylic acid and/or an ethylene methacrylic acid copolymer having acidic side groups, as described above, and a polymer having ester side groups.

The polymer having ester side groups may be a thermoplastic polymer.

The polymer having ester side groups may further comprise acidic side groups. The polymer having ester side groups may be a copolymer of a monomer having ester side groups and a monomer having acidic side groups. The polymer may be a copolymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in one example 1 to 20 carbons, in one example 1 to 10 carbons; in one example selected from methyl, ethyl, iso-propyl, n-propyl, t-butyl, iso-butyl, n-butyl, and pentyl.

The polymer having ester side groups may be a copolymer of a first monomer having ester side groups, a second monomer having acidic side groups and a third monomer which is an alkylene monomer absent of any acidic and ester side groups. The polymer having ester side groups may be a copolymer of (i) a first monomer having ester side groups selected from esterified acrylic acid or esterified methacrylic acid, in one example an alkyl ester of acrylic or methacrylic acid; (ii) a second monomer having acidic side groups selected from acrylic or methacrylic acid; and (iii) a third monomer which is an alkylene monomer selected from ethylene and propylene. The first monomer may constitute about 1% to about 50% by weight of the copolymer, in one example about 5% to about 40% by weight, in one example about 5% to about 20% by weight of the copolymer, in one example about 5% to about 15% by weight of the copolymer. The second monomer may constitute about 1% to about 50% by weight of the copolymer, in one example about 5% to about 40% by weight of the copolymer, in one example about 5% to about 20% by weight of the copolymer, in one example about 5% to about 15% by weight of the copolymer. The first monomer may constitute about 5% to about 40% by weight of the copolymer, the second monomer constitutes about 5% to about 40% by weight of the copolymer, and with the third monomer constituting the remaining weight of the copolymer. In one example, the first monomer constitutes about 5% to about 15% by weight of the copolymer, the second monomer constitutes about 5% to about 15% by weight of the copolymer, with the third monomer constituting the remaining weight of the copolymer. In one example, the first monomer constitutes about 8% to about 12% by weight of the copolymer, the second monomer constitutes about 8% to about 12% by weight of the copolymer, with the third monomer constituting the remaining weight of the copolymer. In one example, the first monomer constitutes about 10% by weight of the copolymer, the second monomer constitutes about 10% by weight of the copolymer, and with the third monomer constituting the remaining weight of the copolymer. The polymer may be selected from the BYNEL® class of monomer, including BYNEL® 2022 and BYNEL® 2002, which are available from DuPont Company, USA.

The polymer having ester side groups may constitute about 1% or more by weight of the total amount of the first polymeric resin in the ink composition and/or the printing composition printed on the print substrate. The polymer having ester side groups may constitute 5 about % or more by weight of the total amount of the first polymeric resin polymers, in one example about 8% or more by weight of the total amount of the first polymeric resin polymers, in one example about 10% or more by weight of the total amount of the first polymeric resin polymers, in one example about 15% or more by weight of the total amount of the first polymeric resin polymers, in one example about 20% or more by weight of the total amount of the first polymeric resin polymers, in one example about 25% or more by weight of the total amount of the first polymeric resin polymers, in one example about 30% or more by weight of the total amount of the first polymeric resin polymers, in one example about 35% or more by weight of the total amount of the first polymeric resin polymers in the ink composition and/or the ink composition printed on the print substrate. The polymer having ester side groups may constitute from about 5% to about 50% by weight of the total amount of the first polymeric resin polymers in the ink composition and/or the ink composition printed on the print substrate, in one example about 10% to about 40% by weight of the total amount of the first polymeric resin polymers in the ink composition and/or the ink composition printed on the print substrate, in one example about 5% to about 30% by weight of the total amount of the first component resin polymers in the ink composition and/or the ink composition printed on the print substrate, in one example about 5% to about 15% by weight of the total amount of the first polymeric resin polymers in the ink composition and/or the ink composition printed on the print substrate in one example about 15% to about 30% by weight of the total amount of the first component resin polymers in the ink composition and/or the ink composition printed on the print substrate.

The polymer having ester side groups may have an acidity of about 50 mg KOH/g or more, in one example an acidity of about 60 mg KOH/g or more, in one example an acidity of about 70 mg KOH/g or more, in one example an acidity of about 80 mg KOH/g or more. The polymer having ester side groups may have an acidity of 100 mg KOH/g or less, in one example about 90 mg KOH/g or less. The polymer having ester side groups may have an acidity of about 60 mg KOH/g to about 90 mg KOH/g, in one example about 70 mg KOH/g to about 80 mg KOH/g.

The polymer having ester side groups may have a melt flow rate of about 10 g/10 minutes to about 120 g/10 minutes, in one example about 10 g/10 minutes to about 50 g/10 minutes, in one example about 20 g/10 minutes to about 40 g/10 minutes, in one example about 25 g/10 minutes to about 35 g/10 minutes.

The polymeric resin may comprise copolymers of any suitable material chemistry. In one example, the polymeric resin comprises ethylene acid copolymers; ethylene acrylic acid copolymers; methacrylic acid copolymers; ethylene vinyl acetate copolymers; copolymers of ethylene and alkyls, acrylic acid and alkyls, methacrylic acid and alkyls (with carbon chain lengths between 1 and 20 carbons, inclusive); esters of methacrylic acid or acrylic acid; polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate or ethylhexylacrylate); ethylene-acrylate terpolymers; ethylene-acrylic esters; maleic anhydride ("MAH") or glycidyl methacrylate ("GMA") terpolymers; low molecular weight ethylene-acrylic acid ionomers (i.e., those having a molecular weight of less than about 1000 amu); or combinations thereof. In one example, the polymer resin comprises at least one of the NUCREL® or BYNEL® family of polymers (available from DuPont Company, Wilmington, Del., USA)—e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 699, NUCREL® 960, NUCREL® RX 76, NUCREL® 2806; BYNEL® 2002, BYNEL® 2014, or BYNEL® 2020; the ACLYN® family of polymers (available from Honeywell International, Inc., Morristown, N.J. USA)—e.g., ACLYN® 201, ACLYN® 246, ACLYN® 285, or ACLYN® 295; or the LOTADER® family of polymers (available from Arkema, Inc., King of Prussia, Pa., USA)—e.g., LOTADER® 2210, LOTADER® 3430, or LOTADER® 8200. Another example of suitable polymeric resins is A-C® family of resins, such as A-C® 5120, available from Honeywell, USA. The polymeric resin may have at least one functional group, such as carboxylic acid, ester, amide, amine, urea, anhydride, aromatic, or halogen based groups. Any of the polymeric resins described herein may be used alone or in combination.

The polymeric resin may be of any content value in the ink particles, depending on the application. For example, the polymeric resin may be greater than about 40 wt % of the ink particles, such as greater than or equal to about 45 wt %—e.g., greater than or equal to about 50 wt %, about 60 wt %, about 70 wt %, about 80 wt %, or higher.

Charge Director & Charge Adjuvant

The ink composition described herein may comprise a charge director. To be employed in an LEP application, the ink particles may be charged, for example, before the particles are incorporated into a toner. The charging may involve using at least one charge director. The charge director may be added to an ink composition or an electrostatic ink in order to impart and/or maintain sufficient electrostatic charge on particles within the ink composition or the electrostatic ink. The charge director may also be employed in an LEP ink to prevent undesirable aggregation of the ink particles in a carrier fluid. The charge director may be a natural charge director ("NCD") or a synthetic charge director ("SCD"). For example, the charge director may be a basic charge director, an acidic charge director, or a neutral charge director. The term "charge director" may refer to a material that, when employed, facilitates charging of the ink particles, thereby enhancing the electrophoretic mobility of the ink particles during an LEP. In one example, the charge director is basic, which basic charge director may react with an acid-modified ink particle to charge negatively the particle. In other words, the charging of the particle may be accomplished using an acid-base reaction (or interaction) between the charge director and the acid-modified particle surface. In another example, the charge director is acidic, which acidic charge director may react (or interact) with the base-modified ink particle to charge positively the particle. The charging of the pigment particle may be accomplished via an acid-base reaction (or interaction) between the charge director and the base-modified particle surface. In one example, the charge director is an overall neutral charge director, having an overall net charge of zero.

The charge director may comprise small molecules or polymers that are capable of forming reverse micelles in a non-polar carrier fluid. Such a charge director may be colorless and may tend to be dispersible or soluble in the carrier fluid. The charge director may comprise a neutral and non-dissociable monomer or polymer, such as, for example, a polyisobutylene succinimide amine, which in one example has a molecular structure as follows:

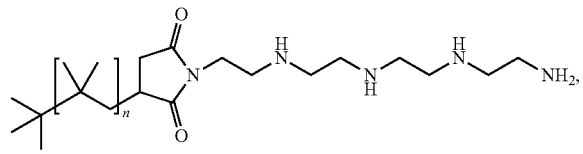

where "n" is an integer ranging from 15 to 100.

The charge director may be selected from ionic compounds, such as metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. For example, the charge director may comprise, or be, at least one of a lecithin, a sulfonate salt, and a sulfosuccinate salt. One example of a charge director includes an ionizable molecule that is capable of disassociating to form charges. Examples of such a charge director include a metal salt of dialkyl sulfosuccinate, sodium di-2-ethylhexylsulfosuccinate or dioctyl sulfosuccinate. In one example, the molecular structure of dioctyl sulfosuccinate is as follows:

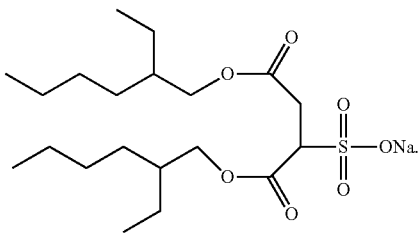

In one example, the charge director is selected from, but is not limited to, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates. In one example, the charge director imparts a negative charge on the particles of the ink composition or the particles of an electrostatic ink. In one example, the charge director imparts a positive charge on the particles of the ink composition or the particles of an electrostatic ink. In one example, the charge director comprises a phospholipid, in one example a salt or an alcohol of a phospholipid. In one example, the charge director comprises species selected from a phosphatidylcholine and derivatives thereof.

The charge director may be a commercially available product. For example, the charge director may be an HP Imaging Agent™ (of the HP Imaging Agent™ series) commercially available from Hewlett-Packard Company. The charge director may comprise a sulfosuccinate-containing molecule. For example, the charge director may comprise (a) nanoparticles of a simple salt; and (b) a sulfosuccinate salt of the general formula $MA_n$, wherein M is a metal, n is the valence of M, and A is an ion of the general formula (I): [$R_1$—O—C(O)CH$_2$CH(SO$_3^-$)C(O)—O—$R_2$], wherein each of $R_1$ and $R_2$ is an alkyl group. In this example, the charge director material is substantially free of acids of the general formula (I), wherein one or both of $R_1$ and $R_2$ is hydrogen, and if only one of them is hydrogen, the other is an alkyl group. The charge director may comprise (a) nanoparticles of a simple salt; (b) a first micelle forming substance, being sulfosuccinate salt of the general formula $MA_n$, wherein M is a metal, n is the valence of M, and A is an ion of the general formula (I): [$R_1$—O—C(O)CH$_2$CH(SO$_3^-$)C(O)—O—$R_2$], wherein each of $R_1$ and $R_2$ is an alkyl group; and (c) a second micelle forming substance. The aforementioned simple salt may comprise a cation that is $Mg^{+2}$, $Ca^{+2}$, $Ba^{+2}$, $NH_4^+$, tert-butyl ammonium, $Li^+$, and $Al^{+3}$, or from any sub-group thereof. The aforementioned simple salt may comprise an anion that is $SO_4^{-2}$, $PO_4^{-3}$, $NO_3^-$, $HPO_4^{-2}$, $CO_3^{-2}$, acetate, trifluoroacetate (TFA), $Cl^-$, $Br^-$, $I^-$, $ClO_4^-$, and $TiO_3^{-4}$, or from any sub-group thereof. For example, the salt may comprise $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, $LiTFA$, $Al_2(SO_4)_3$, $LiClO_4$ and $LiBF_4$, or any sub-group thereof.

Another example of a charge director includes a zwitterion charge director such as, for example, lecithin (e.g., soya lecithin). The molecular structure of lecithin is shown as follows:

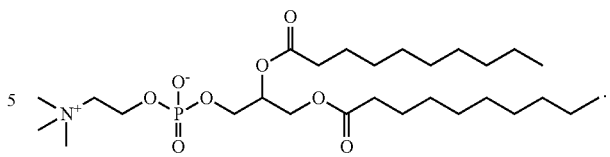

Other suitable charge directors may also be employed.

Another example of a charge director is a sulfonate salt. The sulfonate salt may be, for example, a barium sulfonate salt, such as basic barium petronate ("BBP"). In one example, basic barium petronate is a barium sulfonate salt of a 21-26 hydrocarbon alkyl. The sulfonate salt may be an amine salt, such as an isopropyl amine sulfonate salt (which is also a sulfonate salt). In one example, isopropyl amine sulfonate salt is dodecyl benzene sulfonic acid isopropyl amine.

The aforedescribed charge directors may be employed in any combination. For example, a combination of lecithin, barium sulfonate salt, and isopropyl amine sulfonate salt may be used. The charge director(s) may be present in the ink composition at any suitable amount. For example, the charge director may constitute about 0.001% to 20%, in one example 0.01% to 20% by weight, in one example about 0.01 to about 10% by weight, in one example about 0.01% to about 1% by weight of the solids of an ink composition described herein. In one example, the charge director constitutes about 0.001% to about 0.15% by weight of the solids of the ink composition, in one example about 0.001% to about 0.15%, in one example about 0.001% to about 0.02% by weight of the solids of an ink composition described herein, in one example about 0.1% to about 2% by weight of the solids of the ink composition, in one example about 0.2% to about 1.5% by weight of the solids of the ink composition, in one example about 0.1% to about 1% by weight of the solids of the ink composition, in one example about 0.2% to about 0.8% by weight of the solids of the ink composition. For example, the charge director may be present at an amount of at least about 1 mg of charge director per gram of solids of the electrostatic ink composition (which will be abbreviated to mg/g)—e.g., at least about 2 mg/g, about 5 mg/g, about 10 mg/g, about 15 mg/g, about 20 mg/g, about 25 mg/g, about 50 mg/g, about 60 mg/g, about 80 mg/g, about 100 mg/g, or more. Other values are also possible.

In addition to at least one charge director, the ink composition described herein may also comprise at least one charge adjuvant. A charge adjuvant sometimes is known as a "grinding aid." It is noted that the types of charge director and charge adjuvant, for the purposes of this disclosure, constitute a pigment.

A charge adjuvant may promote charging of the particles when a charge director is present. The charge adjuvant may comprise, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In one example, the charge adjuvant is aluminum di or tristearate.

The charge adjuvant may be present at an amount of about 0.1 to about 5% by weight, in one example about 0.1 to about 1% by weight, in one example about 0.3 to about 0.8% by weight of the solids of the ink composition, in one example about 1 wt % to about 3 wt % of the solids of the ink composition, in one example about 1.5 wt % to about 2.5 wt % of the solids of the ink composition.

In one example, the ink composition further comprises, e.g., as a charge adjuvant, a salt of multivalent cation and a fatty acid anion. The salt of multivalent cation and a fatty acid anion may act as a charge adjuvant. The multivalent cation may, in one example, be a divalent or a trivalent cation. In one example, the multivalent cation is selected from Group 2, transition metals and Group 3 and Group 4 in the Periodic Table. In one example, the multivalent cation comprises a metal selected from Ca, Sc, Ti, V, Cr, Mn, Fe, Co, Ni, Cu, Zn, Al, Y, and Pb. In one example, the multivalent cation is $Al^{3+}$. The fatty acid anion may be selected from a saturated or unsaturated fatty acid anion. The fatty acid anion may be selected from a $C_8$ to $C_{26}$ fatty acid anion, in one example a $C_{14}$ to $C_{22}$ fatty acid anion, in one example a $C_{16}$ to $C_{20}$ fatty acid anion, in one example a $C_{17}$, $C_{18}$, or $C_{19}$ fatty acid anion. In one example, the fatty acid anion is selected from a caprylic acid anion, capric acid anion, lauric acid anion, myristic acid anion, palmitic acid anion, stearic acid anion, arachidic acid anion, behenic acid anion, and cerotic acid anion.

The charge adjuvant, which may, for example, be or comprise a salt of multivalent cation and a fatty acid anion, may be present at an amount of 0.1 wt % to about 5 wt % of the solids of the ink composition, in one example in an amount of about 0.1 wt % to about 2 wt % of the solids of the ink composition, in one example in an amount of about 0.1 wt % to about 2 wt % of the solids of the ink composition, in one example in an amount of about 0.3 wt % to about 1.5 wt % of the solids of the ink composition, in one example about 0.5 wt % to about 1.2 wt % of the solids of the ink composition, in one example about 0.8 wt % to about 1 wt % of the solids of the ink composition, in one example about 1 wt % to about 3 wt % of the solids of the ink composition, in one example about 1.5 wt % to about 2.5 wt % of the solids of the ink composition.

Carrier Fluid

One constituent of the ink composition described herein may be a carrier fluid. The term "carrier fluid" may refer to a fluid in which the ink particles, including the first and second polymeric resins, are dispersed to form an ink dispersion. In one example, the carrier fluid acts as a dispersing medium for the other constituents, such as the ink particles, in an ink composition. A carrier fluid may be formulated for electrophotographic printing such that the electrophotographic ink has a viscosity and conductivity suitable for such printing. The carrier fluid may be non-polar and substantially non-aqueous—e.g., containing less than about 0.5 wt % water. In another example, the hydrocarbon may be non-aqueous—i.e., containing no water. The carrier fluid may comprise at least one additive, such as surfactants, organic solvents, charge control agents, charge directors, viscosity modifiers, stabilizing agents, anti-kogation agents, etc.

The carrier fluid may comprise, or be, a non-polar carrier. The non-polar carrier of the carrier fluid may be the same non-polar carrier employed throughout the process of forming an ink slurry and/or the final ink composition. The carrier fluid may have a different composition from that of the polymeric resin. A non-polar fluid may refer to a fluid that has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity.

The carrier fluid may comprise or be a hydrocarbon, silicone oil, vegetable oil, etc. The carrier fluid may comprise, but is not limited to, an insulating, non-polar, non-aqueous liquid that may be used as a medium for the first and second polymeric resins of the ink particles. The carrier fluid may comprise compounds that have a resistivity in excess of about $10^9$ ohm-cm. The carrier fluid may have a dielectric constant below about 5, in one example below about 3. The carrier fluid may comprise, but is not limited to, hydrocarbons. The hydrocarbon may comprise, but is not limited to, an aliphatic hydrocarbon, an isomerized aliphatic hydrocarbon, branched chain aliphatic hydrocarbons, aromatic hydrocarbons, and combinations thereof.

Examples of non-polar carriers comprise dielectric liquids, non-oxidative water immiscible liquids (e.g., petroleum distillates), hydrocarbon-based carriers (e.g., aliphatic (i.e., linear/acyclic or cyclic) hydrocarbons, branched-chain aliphatic hydrocarbons, etc.), silicone oil, soy bean oil, vegetable oil, plant extracts, etc. In one example, the non-polar carrier is an alkane or a cycloalkane having from 6 to 14 carbon atoms (e.g., n-hexanes, heptanes, octane, dodecane, cyclohexane etc.), t-butylbenzene, 2,2,4-trimethylpentane, or combinations thereof. Examples of a non-polar carrier fluid comprise at least one substituted or unsubstituted hydrocarbon. The hydrocarbon may be linear, cyclic, or branched, and may be substituted with any suitable functional group. Examples of such hydrocarbons comprise any of dielectric liquids, non-oxidative water immiscible liquids, paraffins, isoparaffins, and oils. Examples of paraffins and isoparaffins comprise those in the ISOPAR® family (Exxon Mobil Corporation, USA), including, for example, ISOPAR®-G, ISOPAR®-H, ISOPAR®-K, ISOPAR®-L, ISOPAR®-M, and ISOPAR®-V. Additional examples of a suitable carrier fluid include NORPAR 13™, NORPAR 15™, Exxol D40™, Exxol D80™, Exxol D100™, Exxol D130™, and Exxol D140™, also available from Exxon Mobil Corporation, USA. Some additional examples of a suitable carrier fluid include Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each available from NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). In other examples of a suitable carrier fluid, other hydrocarbons that may be used as the non-polar carrier fluid comprise those in the SOLTROL® family (available from Chevron Phillips Chemical Company, USA) or SHELLSOL® (available from Shell Chemicals, USA).

In one example, the non-polar carrier fluid comprises any of linear, branched, and cyclic alkanes having from about 6 to about 100 carbon atoms, inclusive; hydrocarbons having from 6 to 14 carbon atoms, inclusive; cycloalkanes having from 6 to 14 carbon atoms, inclusive (e.g., n-hexanes, heptanes, octane, dodecane, cyclohexane, etc.); t-butylbenzene; 2,2,4-trimethylpentane; isoparaffinic hydrocarbons; paraffinic hydrocarbons; aliphatic hydrocarbons; de-aromatized hydrocarbons; halogenated hydrocarbons; cyclic hydrocarbons; functionalized hydrocarbons; or combinations thereof. The hydrocarbon may comprise oils, examples of which may comprise, silicone oil, soy bean oil, vegetable oil, plant extracts, or combinations thereof. The hydrocarbon comprised in the non-polar carrier fluid may be substantially non-aqueous—i.e., comprising less than about 1 wt % water—e.g., less than about 0.5 wt %, about 0.2 wt %, or lower. In one example, the hydrocarbon comprises no water. Any of the carrier fluids described herein may be used alone or in combination.

The carrier fluid may constitute about 20% to about 99.5% by weight of the ink composition, in one example about 50% to about 99.5% by weight of the ink composition. The carrier fluid may constitute about 40 to about 90% by weight of the ink composition. The carrier fluid may constitute about 60% to about 80% by weight of the ink composition. The carrier fluid may constitute about 90% to about 99.5% by weight of the ink composition, in one example about 95% to about 99% by weight of the ink composition.

The ink composition described herein, when printed on a print substrate, may be substantially free from carrier fluid—the printed composition is described further below. In an electrostatic printing process and/or afterwards, the carrier fluid may be removed, e.g., by an electrophoresis processes during printing and/or evaporation, such that substantially just solids are transferred to the print substrate. Substantially free from carrier fluid may indicate that the ink composition printed on the print substrate contains less than about 5 wt % carrier fluid, in one example, less than about 2 wt % carrier fluid, in one example less than about 1 wt % carrier fluid, in one example less than about 0.5 wt % carrier fluid. In one example, the printing composition printed on the print substrate is free from carrier fluid.

Tackifiers

The ink composition described herein may comprise at least one tackifier. In one example, tackifiers are chemical compounds that may be employed in formulating adhesives to increase the tack, the stickiness of the surface of the adhesive. They may be low-molecular weight compounds with high glass transition temperature. In one example, at low strain rates they provide higher stress compliance and become stiffer at higher strain rates. Tackifiers may have a low molecular weight, and glass transition and softening temperature above room temperature, providing them with suitable viscoelastic properties.

The tackifier described herein may comprise a polymer that has a relatively low molecular weight. For example, the molecular weight Mn may be between about 400 and about 5000—e.g., between about 500 and about 3000, between about 600 and about 1000, between about 700 and about 800, etc. Other values are also possible.

The tackifier described herein may also have a softening temperature that is above room temperature. The softening temperature may be sufficient to allow the tackifier to be soft and flow on the blanket—in one example allowing for the possibility of film forming. For example, the softening temperature of the tackifier may be between about 50° C. and about 300° C.—e.g., between about 60° C. and about 250° C., between about 70° C. and about 200° C., between about 80° C. and about 150° C., between about 90° C. and about 120° C., etc. Other values are also possible. In one example, the softening temperature is about 100° C.

The tackifier described herein may have a relatively high polarity. In one example, the polarity is sufficiently high to achieve repulsion from the blanket and/or better compatibility with the substrate. The polarity of the tackifier may be reflected in the functional group of the polymer thereof. For example, the tackifier may have a polar functional group, such as a polar acid group. Not to be bound by any particular theory, but due at least in part to its polarity, the tackifier described herein may have a relatively high solubility in the non-polar carrier fluid. The carrier fluid may be any of those described here (e.g., isoparaffin, such as Isopar®). In one example, the tackifier described herein may be dissolved in the non-polar carrier fluid completely. A complete dissolution herein may encompass a minute variation—e.g., at least 95% dissolution, such as 98%, 99%, 99.5%, or higher, dissolution. The percentage may refer to volume or weight, depending on the context.

The tackifier described herein may have any suitable chemistry. For example, the tackifier may comprise, or be, resins. For example, the tackifier may comprise, or be, rosins and their derivatives, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with ethylene-vinyl acetate adhesives). In one example, the tackifier comprises at least one of a hydrocarbon resin, a hydrogenated hydrocarbon resin, a dimerized acid rosin, a terpene phenolic resin, an abietic acid, a rosin ester, and a polyterpene.

The tackifier described herein may be commercially available products. For example, the tackifier may be of the Regalite™ family and the Dymerex™ family, availably by Eastman Chemical Company, USA. For example, the tackifier may be Regalite™ S 5100, Regalite™ R 1100, etc. In one example, the tackifier comprises, or is, a dimerized acid rosin, such as the Dymerex™ popolymerized rosin. For example, the tackifier may be of the Sylvares™ family and the Sylvatac™ family, availably by Arizona Chemical, USA. For example, the tackifier may be Sylvares™ TP-105, Sylvares™ TRB115, Sylvatac™ RE 95, etc. For example, the tackifier may be of the Nures™ family, available by Newport Industries, USA. For example, the tackifier is Nures™ TP100. In one example, TP100 comprises a terpene phenolic resin, an abietic acid, and a rosin ester. Other tackifiers are also possible.

Not to be bound by any particular theory, but the increasing chemistry compatibility of the tackifier to the substrate may enhance image transfer to the substrate and enhance incompatibility of the image to the silicone based releasing surface of the blanket. As a result, this may enhance the transfer of the image from the blanket to the substrate.

Other Additives

The ink composition may comprise an additive or a plurality of additives. The additive or plurality of additives may be added at any stage of producing the ink composition. The additive or plurality of additives may be selected from a wax, a surfactant, biocides, organic solvents, viscosity modifiers, materials for pH adjustment, sequestering agents, preservatives, compatibility additives, emulsifiers, and the like. The wax may be an incompatible wax. The term "incompatible wax" may refer to a wax that is incompatible with the resin. Specifically, the wax phase separates from the resin phase upon the cooling of the resin fused mixture on a print substrate during and after the transfer of the ink composition to a print substrate during printing of the ink composition.

Making/Using the Ink Composition

Electrophotographic printing techniques may involve the formation of a latent image on a photoconductor surface mounted on an imaging plate. In one example, the photoconductor may first be sensitized to light, in one example through charging with a corona discharge, and then may be exposed to light projected through a positive film of the document to be reproduced. This may result in dissipation of the charge in the exposed areas and the formation of a latent image on the photoconductor. The latent image may subsequently be developed into a full image by the attraction of oppositely charged toner particles to the charge remaining on the unexposed areas. Next, the developed image may be transferred from the photoconductor to the blanket, which in one example is a fabric-reinforced sheet of rubber or polymer wrapped around a cylinder which may receive the toner from the photoconductor before it is transferred to the substrate. From the blanket, the image may be transferred to organic or inorganic substrates, such as paper, plastic or other suitable materials, by heat, pressure, a combination thereof, or any other suitable method, to produce the printed final image.

FIG. 1 is flowchart showing the processes involved in one example of a method of manufacturing the LEP ink composition described herein. The method may comprise dissolving a tackifier in a non-polar carrier fluid comprising a polymer to form a mixture (S101). The tackifier and non-polar carrier fluid may be any of those described herein. The tackifier may be dissolved at any suitable concentration. For example, the tackifier may be dissolved in the fluid at less than or equal to about 10%—e.g., between about 0% and about 10%, between about 2% and about 8%, between about 4% and about 6%, etc. In one example, the concentration is between about 1% and about 5%. The percentage herein may refer to volume or weight percentage, depending on the context. In one example, the percentage refers to weight %.

The method may further comprise combining the mixture with a charge director and ink particles each comprising a polymeric resin and a pigment dispersed in the resin to form the liquid electrophotographic ink composition (S102). The charge director and ink particles may be any of those described herein.

The method as described in FIG. 1 may further comprise using the manufactured ink composition in a printing process. The printing process may involving using any of the printers described above. The printing process may comprise disposing the liquid electrophotographic ink composition over a portion of a substrate. The printing process may further comprise drying the disposed liquid electrophotographic ink composition to form an image over the portion. The drying process may involve application of heat and/or pressure.

In one example, the ink composition containing at least one tackifier described herein exhibits tackifying characteristic. For example, the ink composition may adhere the dried image thin film to the substrate with better peeling results (than an ink without a tackifier). In addition, most of the tackifier materials may be relatively polar, therefore the polar groups may reject from the hydrophobic blanket and improve adhesion to the hydrophilic substrate.

The ink composition may be fabricated by combining at least ink particles, such as any of those described herein, a charge director, such as any of those described herein, and at least a carrier fluid, such as any of those described herein. Depending on the application, the ink composition may be fabricated by incorporating additional constituents, such as at least one additive, including, for example, surfactants, organic solvents, charge control agents, viscosity modifiers, stabilizing agents, and anti-kogation agents. In one example, the additives comprise at least one of charge control agents, dispersants, plasticizers, polymers, resins, rheology modifiers, salts, stabilizers, surfactants, UV curable materials, viscosity modifiers, and surface-active agents. The additives may be present at between about 0 wt % and about 10 wt % of the ink composition; other values are also possible.

Additionally, the method may further comprise adding an amount of a carrier fluid to adjust the concentration of the ink particles so that the ink particles are present in the ink composition at a desirable content value, such as those described above. For example, the process of fabricating the ink composition may comprise making any of the ink composition constituents, including the ink particles, such as any of the ink particles described herein. In one example, the method of making the ink particles comprises extruding the raw materials to form an extrudant, cooling the extrudant, and forming the cooled extrudant to form the ink particles.

The raw materials may comprise any suitable material that may be employed to make the ink particles. For example, the raw materials may comprise at least one ceramic. The ceramic may be a composite. The ceramic may comprise at least one metal oxide, such as any of the metal oxides described herein. In one example, the at least one metal oxide comprises titanium dioxide. In another example, the at least one metal oxide comprises multiple types of metal oxides, including at least one of titanium dioxide, aluminum oxide, and zinc oxide. The raw materials may comprise the polymeric resins described herein. In one example, the polymeric resin comprises a mixture of a polyethylene acrylic acid resin and polyethylene methacrylic acid resin (as the first polymeric resin) and a second polymeric resin. The raw materials may comprise at least one charge director, such as any of the charge directors described herein. In one example, the charge director is a natural charge director.

The polymeric resin mixture may be melted before the addition of the metal oxide into the molten resin mixture to form an extrudant; or the resin may be melted together with (i.e., in the presence of) the metal oxide. In one example, at least one polymer resin is melted before the at least one metal oxide is incorporated into the molten resin.

Depending on the application, including the materials involved, the extrusion may involve any extrusion suitable for a polymeric material. For example, the extrusion may involve a plastic/polymer extrusion. The extrusion may be, for example, hot extrusion, warm extrusion, cold extrusion, etc. The extrusion may be, for example, blown film extrusion, sheet/film extrusion, tubing extrusion, over-jacketing extrusion, co-extrusion, etc. Depending on at least the materials involved, the extrusion may involve any suitable processing conditions, including rotation speed and temperature. For example, the extrusion may involve a rotation speed of at least about 50 rpm—e.g., at least about 100 rpm, about 150 rpm, about 200 rpm, about 250 rpm, about 300 rpm, or more. Other values are also possible. For example, the extrusion may involve an extrusion temperature of at least about 60° C.—e.g., at least about 80° C., about 100° C., about 120° C., about 140° C., about 160° C., about 180° C., about 200° C., or higher. Other values are also possible. The temperature profile of the extrusion condition may comprise a temperature profile varying with time, such as a ramp up and/or down profile.

The extrudant may be cooled to allow for further processing. The cooling may involve any suitable process to lower the temperature of the extrudant from one temperature to another lower temperature. The lower temperature may be any suitable temperature, such as room temperature. For example, the cooling may involve a bath, such as a water bath. After the extrudant is cooled, the cooled extrudant may undergo additional processing, including reducing the size of the extrudant. The size reduction may involve any suitable process. For example, the cooled extrudant may be formed into pellets. The pellets may have any geometry. In one example, the pellets are cylindrical. In one example, the pellets have an average diameter of about 0.5 mm and about 10 mm—e.g., about 1 mm and about 8 mm, about 2 mm and about 6 mm, about 3 mm and about 4 mm, etc. In one example, the pellets have an average length of about 0.1 mm and about 2 mm—e.g., about 0.2 mm and about 1.6 mm, about 0.4 mm and about 1.2 mm, about 0.6 mm and about 0.8 mm, etc. Other average diameter and length values are also possible.

The pellets may be further processed, such as to further reduce the size thereof. This further size reduction may involve any suitable process, depending on the application, such as the materials involved. Examples of the size reduction process may comprise at least one of grinding, precipitation, homogenization, microfluidization, and the like. The grinding may involve, for example, milling. The milling may be, for example, ball milling. Depending on the application, such as the materials involved, any suitable grinding condition may be employed to reduce the size of the pellets. In one example wherein milling is employed, the pellets are ground in a bead mill at a temperature that is above room temperature, such as at greater than or equal to about 40° C.—e.g., greater than or equal to about 50° C., about 60° C., about 70° C., about 80° C., about 90° C., about 100° C., or higher. Other temperature values are also possible. In one example wherein milling is employed, the pellets are ground in a bead mill for a period of less than or equal to about 20 hours—e.g., less than or equal to about 18 hours, about 16 hours, about 14 hours, about 12 hours, about 10 hours, about 8 hours, about 6 hours, or shorter. In one example, the milling time is between about 6 hours and about 14 hours—e.g., between about 8 hours and about 12 hours, etc. Other milling/grinding times are also possible. The resultant ground particles may be any of the aforedescribed ink particles. For example, these ink particles may be spherical, or almost spherical. These particles may have any of the diameters described herein for ink particles.

As described above, the ink particles fabricated may be combined with other constituents to form an ink composition. In one example, the ink particles are charged before being incorporated with other ink composition constituents (e.g., carrier fluid) into a toner. In another example, the ink particles are charged by being co-existing with at least one charger director in the ink composition. The ink composition may then be employed in a variety of applications. For example, the ink composition may be printed onto a substrate. Any suitable printing technique may be employed. For example, the printing may be digital printing. The digital printing may be, for example, LEP.

During the printing process, at least some of the ink particles may connect to one another as the liquid carrier fluid and/or the polymer resin of the ink particles dries up (or solidifies). The connection may take the form of the ink particles fused together to form particle clusters; the fusing is described further below. The printing conditions may vary depending on the printing process. For example, the printing process may involve digitally pressing the ink composition over a substrate. The digital pressing may be carried out at a temperature above room temperature to facilitate fusing of the ink particles and/or drying of the carrier fluid and/or polymeric resin (of the ink particles). In one example, the pressing temperature is greater than or equal to about 40° C.—e.g., greater than or equal to about 50° C., about 60° C., about 70° C., about 80° C., about 90° C., about 100° C., about 120° C., about 140° C., about 160° C., about 180° C., about 200° C., or higher. Other temperature values are also possible. During digital pressing, the carrier fluid dries up, and, as a result, the ink parties may be fused to create a three-dimensional structure, such as one of those described further below.

Printed Ink Composition

The ink composition described herein may be printed to form a printed ink composition. The printed ink composition may be in the form of a layer disposed over a print substrate. The ink composition may be any of those described herein. In one example of the printed ink composition, the non-polar polymer is no longer a fluid (as in the carrier fluid) and instead is a solidified polymer. The printing may refer to electrophotographic printing, such as LEP. The print substrate may refer to any material suitable for an ink composition to be disposed upon, and the printed ink composition may be used to display a variety of forms and/or images, including text, graphics, characters, images, or photographs. A print substrate may comprise vinyl media, cellulose-based paper media, various cloth materials, polymeric materials (examples of which include polyester white film or polyester transparent film), photopaper (examples of which include polyethylene or polypropylene extruded on one or both sides of paper), metals, ceramics, glass, or mixtures or composites thereof. In one example, the print substrate is a paper, including at least one sheet of paper, a roll of paper, etc.

The printed ink layer may have any suitable thickness. In one example, the thickness is large enough to accommodate a sufficient number of cavities present in the printed ink composition for the printed ink composition to have a desirable opacity. For example, the layer comprising the printed composition may have a thickness that is greater than or equal to about 2 μm—e.g., greater than or equal to about 3 μm, about 4 μm, about 5 μm, about 6 μm, about 7 μm, about 8 μm, about 9 μm, about 10 μm, or larger. In one example, the layer thickness is between about 2 μm and about 6 μm—e.g., between 3 μm and about 5 μm, etc. The printed ink composition may have a different microstructure than does the ink composition before being printed. As described further below, the ink composition described herein may provide certain characteristics to the printed ink composition after printing.

In at least some examples, the tackifier may form an interface, or an interfacial layer relatively thin (as compared to the overall printed ink composition) between the printed ink composition and the substrate. The interfacial layer may be still a part of the printed ink composition. In one example, the interfacial layer is in the ink composition adjacent to the substrate.

Non-Limiting Working Examples

Example 1

Two tackifiers were investigated in this Example: Regalite™ S5100 from Eastman Chemical Company, USA ("Regalite S") and Nures™ TP 100 from Newport Industries, USA ("TP100"). Each tackifier was dissolved in Isopar® (1-5 wt % on liquids) and added to ink compositions to create ink composition samples. The base of the ink composition is HP Indigo's Electroink® 4.5 ("EI4.5"). Electroink® 4.5 without any tackifier was used as the negative control (Ref). The resin system of the ink composition investigated in this Example contained Nucrel™ 925, Nucrel™ 2805, and Bynel 2022™. The charge director employed in this Example is an SCD, which includes a sulfosuccinate salt. All tests were carried out using HP's 7000 Indigo Presses, Hewlett-Packard Company, USA.

All of the ink composition samples were investigated with four different substrates—Euroart™ (by Sappi of USA), UPM (by the Biofore Company, USA), FortuneMatte™ (by New Page of USA), and Soperset™ (by Soperset, USA).

FIGS. 2A-2D show the peeling test results for the ink compositions on the four different substrates (A: Euroart; B: UPM; C: Fortune Matte; and D: Soperset). As shown in FIGS. 2A-2D, all ink composition samples with tackifiers showed significant better results in peeling than the reference ink composition (Ref) (without any tackifiers). The contrast in the peeling test results is particularly evidenced in the magenta ink with different coverage percentage of two tackifiers (Regalite S and TP100), as compared to the Ref sample. Although both Regalite S and TP 100 containing samples showed better results than the Ref sample in all four substrates, TP100 showed better results than the Regalite S samples in all four substrates. Not to be bound by any theory, but the difference may be due to the presence of polar groups in TP100, which increases the adhesion to the substrate and rejection from the blanket. In fact, the paper was torn in the Soperset substrate because of the very strong tackiness.

Furthermore, in a separate test, these tackifier materials were evaluated in three different ink formulations:
1) Nucrel™ 960/ACLYN™ 201 based with a NCD, which includes a combination of lecithin and sulfonate salts.
2) Nucrel™ 960/ACLYN™ 201 based with SCD, which includes a sulfosuccinate salt.
3) Nucrel 925™, Nucrel 2805™, and Bynel 2022™ based ink with SCD, which includes a sulfosuccinate salt.

FIGS. 3A-3D show the test results. In all the test ink formulations, the obtained peeling results showed better results than the reference sample. As shown in FIGS. 3A-3D, the increase in adhesion is significant, particularly seen in the peeling test results of Regalite S within Nucrel™ 960/ACLYN™ 201 based ink composition with an NCD containing a combination of lecithin and sulfonate salts.

In sum, the tackifiers investigated in this Example were found to enable better adhesion of the printed film (ink composition) to all of the substrates investigated than a sample without a tackifier. Specifically, these materials increased adhesion of the dried image to the substrate with better peeling results and increasing media gamut for use with LEP. Also, the addition of the tackifiers achieved desirable peeling results without degrading the transfer of the image from the blanket to substrate.

Example 2

The ink transfer from a blanket to the substrate was investigated in this Example. During LEP, the developed image was transferred from the PIP to the blanket (intermediate transfer media, or "ITM"). On the blanket, the image was melted and fused under heating lamps while the carrier liquid was evaporated. In the next phase the image film was transferred to the substrate (T2). All tests were carried out using HP's 7000 Indigo Presses, Hewlett-Packard Company, USA.

The effects of incorporating tackifiers into LEP ink compositions were investigated in this Example. Two tackifiers were investigated in this Example: Regalite™ S5100 from Eastman Chemical Company, USA ("Regalite S") and Nures™ TP 100 from Newport Industries, USA ("TP100"). Each tackifier was dissolved in Isopar® (1-5 wt % on liquids) and added to base ink compositions to form ink samples. The tackifiers were introduced into two ink systems:
(1) EI4.5 based ink composition with an SCD—Nucrel™ 960/ACLYN™ 201 based with an SCD, which includes a sulfosuccinate salt.
(2) HP Indigo ink composition having a resin system containing Nucrel 925™, Nucrel 2805™, and Bynel 2022™ based ink with an SCD, which includes a sulfosuccinate salt.

It was observed that in both ink systems, the introduction of TP100 as a tackifier resulted in continuous ink transfer from blanket to substrate. The result was particularly surprising for the ink system (2), as the resin system used therein is known to exhibit transferability challenges in some instances.

Not to be bound by any particular theory, but the introduction of tackifier may have enhanced the ink transfer, particularly in T2, as follows:
1) The tackifier that bleeds out of the ink layer on the side of the blanket gradually forms a film on the blanket. The tackifier wets the blanket's surface, but does not adhere to it. It is believed that this film acts as a barrier interfering with ink-blanket adhesion, and/or as a layer that enhances transfer as a "lubricant," by splitting during T2.
2) The tackifier that bleeds out of the ink layer on the opposite side of the ink film functions as a glue between the ink and the substrate enhances ink tackiness to the substrate and further facilitating T2.

Figure 4:
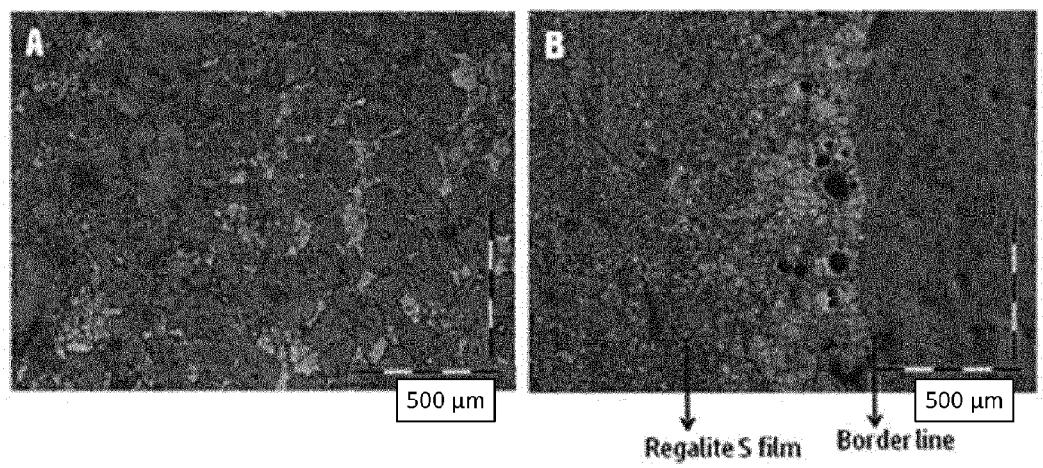
FIGS. 4A-4B show, in one example, optical images of an ink composition containing a tackifier on a (A) new blanket and (B) used blanket.

Support for 1) is shown in FIGS. 4A-4B. FIGS. 4A and 4B show that the Regalite S tackifier wetted used blankets and formed a film—FIG. 4A shows a new blanket and FIG. 4B shows a used blanket. It was observed that the blankets became less hydrophobic with use, enabling film forming of relatively polar tackifier materials.

Figure 5:
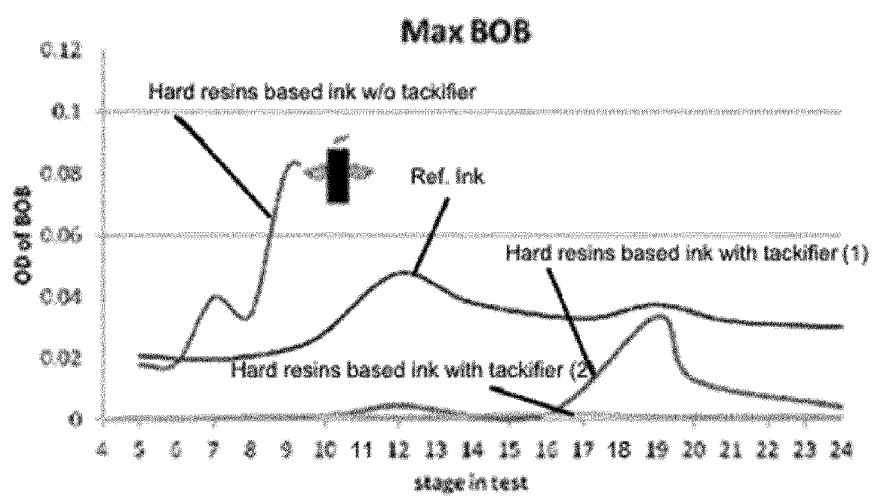
FIG. 5 shows, in one example, background on blanket ("BOB") accumulated ink remnants on blanket in non-image areas) vs. stages in a short press test (20K imp run).

FIG. 5 shows background on blanket ("BOB") accumulated ink remnants on blanket in non-image areas) vs. stages in a short press test (20K imp run). The test was conducted to measure quantitative BOB and background on print ("BOP") outputs via X-RITE ISIS (OD-measuring scanner) and automatic analysis through Excel. The output parameters included BOB levels per area, BOP levels per area, total background transferred to blanket, % background that remained on blanket, cleanability (i.e., number of cleaner pages to clean BOB, normalized by BOB level, and blanket memories (solid K, small dots). The types of blanket "histories" obtained included constant background—areas where no images are ever printed; areas printed for 1 k when the blanket was fresh, and not printed again; and areas printed for 1 k and not printed for 1 k. The Each printed area divides into 5 possible solid images: $1^{st}$ sep, $2^{nd}$ sep, $3^{rd}$ sep, $2^{nd}+3^{rd}$, all 3. Specifically,
Stages 1-2: Install ink & test blanket
Stage 3: 1× Color Adjust
Stages 4-10: 7×BOB+BOP
Stage 11: 3× Color Adjust
Stages 12-17: 6×BOB+BOP
Stage 18: 3× Color Adjust
Stages 19-24: 6×BOB+BOP As shown in the figure, while printing with hard-resins-based ink without tackifier, BOB (ink accumulation) increased during the test until the blanket was unrecoverable and needed to be replaced at stage 10. The two curves representing hard resins based ink with tackifiers were obtained with two different blankets and show shows that with a tackifier as part of the ink system, BOB dropped close to zero and was even better than the reference. The ink system (1) (the one with Nucrel™ 960/ACLYN™ 201 resins) is labelled "Ref. Ink").

Figure 6:
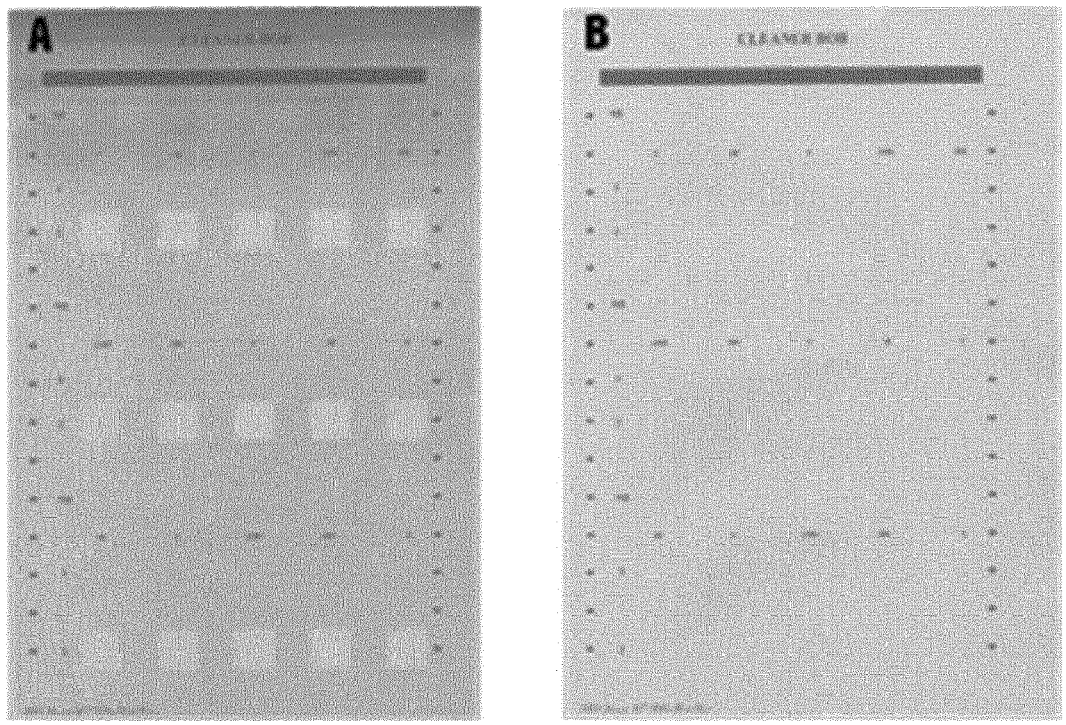
FIGS. 6A-6B show, in one example, optical images of yellow cleaner pages printed at 24 stages in order to clean and recover the blanket.

FIGS. 6A-6B show optical images of yellow cleaner pages printed at 24 stages in order to clean and recover the blanket. FIG. 6A shows a cleaner page printed with hard resins based ink without a tackifier. FIG. 6B shows a cleaner page printed with the same ink that shown in FIG. 6A but with a tackifier (TP100). Both cleaner Pages were printed after the same blanket history, as the same stage of the test. The ink with no tackifier failed at stage 12 and blanket did not survive (FIG. 6A). By contrast, the cleaner page printed with TP100 had no visible ink remnants on it, showing that no ink remained on blanket and that second transfer met satisfaction.

In sum, the tackifiers were found to enhance ink transfer from blanket to substrate. Particularly, the incorporation of a tackifier allows use of high-durability ink and desired charge director, overcoming adhesion-transferability trade-off often faced by these high-durability inks. The tackifier dissolved in the carrier fluid (Isopar®) and performed a dual task of decreasing ink adhesion to the blanket and increasing ink affinity to the substrate, allowing continuous full ink transfer to the substrate. Also, it is believed that the thin interfacial layer film produced by the tackifier on the blanket surface may protect the blanket and avoid ink accumulation on it.

Additional Notes

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A liquid electrophotographic ink composition, comprising:
   a charge director;
   a non-polar carrier fluid comprising a polymer;
   ink particles each comprising a polymeric resin and a pigment dispersed in the polymeric resin; and
   a tackifier, wherein the tackifier comprises a terpene phenolic resin;
   wherein:
      the tackifier has a molecular weight Mn of between about 600 and about 1000; or
      the tackifier has a softening temperature of about 100° C.

2. The liquid electrophotographic ink composition of claim 1, wherein the charge director comprises at least one of a lecithin, a sulfonate salt, or a sulfosuccinate salt.

3. The liquid electrophotographic ink composition of claim 1, wherein the tackifier dissolves completely in an isoparaffin.

4. The liquid electrophotographic ink composition of claim 1, further comprising a charge adjuvant selected from the group consisting of barium petronate, calcium petronate, Ca salts of naphthenic acid, Cu salts of naphthenic acid, Mn salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether and hydroxy bis(3,5-di-tert-butyl salicylic) aluminate monohydrate, and combinations thereof.

5. The liquid electrophotographic ink composition of claim 1, wherein the polymer of the non-polar carrier fluid is selected from the group consisting of a hydrocarbon, silicone oil, soy bean oil, and vegetable oil.

6. A liquid electrophotographic ink composition, comprising:
   a charge director;
   a non-polar carrier fluid comprising a polymer;
   ink particles each comprising a polymeric resin and a pigment dispersed in the polymeric resin; and
   a tackifier, wherein the tackifier comprises a terpene phenolic resin and a dimerized acid rosin.

7. A liquid electrophotographic ink composition, comprising:
   a charge director;
   a non-polar carrier fluid comprising a polymer;
   ink particles each comprising a polymeric resin and a pigment dispersed in the polymeric resin, wherein the polymeric resin comprises a copolymer of ethylene and methacrylic acid; and
   a tackifier, wherein the tackifier comprises a terpene phenolic resin.

8. A method of manufacturing a liquid electrophotographic ink composition, the method comprising:

dissolving a tackifier in a non-polar carrier fluid to form a mixture, wherein the non-polar carrier fluid comprises a polymer, and the tackifier comprises a terpene phenolic resin;

combining the mixture with a charge director and ink particles each comprising a polymeric resin and a pigment dispersed in the polymeric resin to form the liquid electrophotographic ink composition;

wherein the tackifier is disposed in the non-polar carrier fluid at between about 1% and about 5% by weight of the fluid.

9. The method of claim 8, further comprising printing the liquid electrophotographic ink composition, the printing comprising:

disposing the liquid electrophotographic ink composition over a portion of a substrate; and drying the disposed liquid electrophotographic ink composition to form an image over the portion.

10. A liquid electrophotographic ink composition, comprising:

a charge director;

a non-polar carrier fluid comprising a polymer;

ink particles each comprising a polymeric resin and a pigment dispersed in the polymeric resin; and a tackifier, wherein the tackifier comprises a terpene phenolic resin, an abietic acid, and a rosin ester.

* * * * *

UNITED STATES PATENT AND TRADEMARK OFFICE
CERTIFICATE OF CORRECTION

PATENT NO. : 10,437,167 B2
APPLICATION NO. : 15/565107
DATED : October 8, 2019
INVENTOR(S) : Reut Avigdor et al.

Page 1 of 1

It is certified that error appears in the above-identified patent and that said Letters Patent is hereby corrected as shown below:

In the Claims

In Column 28, Line 37, Claim 4, delete "palmirate," and insert -- palmitate, --, therefor.

Signed and Sealed this
Third Day of March, 2020

Andrei Iancu
*Director of the United States Patent and Trademark Office*